United States Patent [19]

Khalidi et al.

[11] Patent Number: 5,956,756

[45] Date of Patent: *Sep. 21, 1999

[54] VIRTUAL ADDRESS TO PHYSICAL ADDRESS TRANSLATION OF PAGES WITH UNKNOWN AND VARIABLE SIZES

[75] Inventors: Yousef A. Khalidi, Sunnyvale; Glen R. Anderson, Palo Alto; Stephen A. Chessin, Mountain View; Shing Ip Kong, Menlo Park; Charles E. Narad, Santa Clara, all of Calif.; Madhusudhan Talluri, Madison, Wis.

[73] Assignee: Sun Microsystems, Inc., Mountain View, Calif.

[*] Notice: This patent is subject to a terminal disclaimer.

[21] Appl. No.: 08/874,201

[22] Filed: Jun. 6, 1997

Related U.S. Application Data

[60] Continuation of application No. 08/465,853, Jun. 6, 1995, abandoned, which is a division of application No. 08/118,398, Sep. 8, 1993, Pat. No. 5,479,627.

[51] Int. Cl.$^6$ ........................................ G06F 12/10
[52] U.S. Cl. ............................................... 711/207
[58] Field of Search .................................. 711/205, 207, 711/209, 206

[56] References Cited

U.S. PATENT DOCUMENTS

| | | | |
|---|---|---|---|
| 3,675,215 | 7/1972 | Arnold et al. | 395/497.02 |
| 4,285,040 | 8/1981 | Carlson et al. | |
| 4,763,250 | 8/1988 | Keshlear et al. | |
| 4,835,734 | 5/1989 | Kodaira et al. | 395/419 |
| 4,914,577 | 4/1990 | Stewart et al. | 395/417 |
| 5,058,003 | 10/1991 | White | 395/419 |
| 5,263,140 | 11/1993 | Riordan | 395/417 |
| 5,327,372 | 7/1994 | Oka et al. | |
| 5,375,214 | 12/1994 | Mirza et al. | 395/417 |
| 5,465,337 | 11/1995 | Kong | 395/417 |
| 5,475,827 | 12/1995 | Lee et al. | 395/417 |
| 5,526,504 | 6/1996 | Hsu et al. | 395/417 |

FOREIGN PATENT DOCUMENTS

| | | |
|---|---|---|
| 0496288A2 | 1/1992 | European Pat. Off. . |
| 0508577 A1 | 2/1992 | European Pat. Off. . |

*Primary Examiner*—Eddie P. Chan
*Assistant Examiner*—Kevin Verbrugge
*Attorney, Agent, or Firm*—Blakely Sokoloff Taylor & Zafman

[57] ABSTRACT

A method and apparatus for translating a virtual address to a physical address. A virtual address to be translated has a virtual page offset and a virtual page number. The virtual address to be translated addresses a page of memory. The size of this page is unknown. There are L different possible page sizes where L is a positive integer greater than one. Each of the L different page sizes is selected to be a test page size and a test is performed. During the test, a pointer into a translation storage buffer is calculated. The pointer is calculated from the virtual address to be translated by assuming that the virtual address to be translated corresponds to a mapping of the test page size. The pointer points to a candidate translation table entry of the translation storage buffer. The candidate translation table entry has a candidate tag and candidate data. The candidate tag identifies a particular virtual address and the candidate data identifies a particular physical address corresponding to the particular virtual address. A virtual address target tag is extracted from the virtual address to be translated. The virtual address target tag is calculated by assuming that the virtual address to be translated corresponds to a mapping of the test page size. The target tag and the candidate tag are then compared. If the target tag matches the candidate tag, the candidate data is provided as the physical address translation corresponding to the virtual address to be translated.

17 Claims, 9 Drawing Sheets

VIRTUAL ADDRESS TO PHYSICAL ADDRESS TRANSLATION OF PAGES WITH UNKNOWN AND VARIABLE SIZES

This is a Continuation Application of application Ser. No. 08/465,853, filed Jun. 6, 1995, now abandoned, which is a Divisional Application of Ser. No. 08/118,398 filed on Sep. 8, 1993 which issued into U. S. Pat. No. 5,479,627.

BACKGROUND OF THE INVENTION

1. Field of the Invention

The present invention relates to the field of computer systems. More specifically, the present invention relates to translation from a virtual address to a physical address in a virtual memory computer system.

2. Art Background

Virtual memory is a technique that allows an application to see the system as providing a large uniform primary memory, which in reality may be smaller, more fragmented, and/or partially simulated by secondary storage such as a hard disk. Applications access memory through virtual addresses, which are translated (mapped) by special hardware onto physical addresses. Paging and segmentation are two common implementations of virtual memory.

When implementing virtual memory using the paging technique, the virtual address space is divided into a number of fixed-size blocks called pages, each of which can be mapped onto any of the similarly sized physical pages available on the system. Typically, special memory management hardware such as a memory management unit (MMU) or paged memory management unit (PMMU) performs the address translation from virtual addresses to physical addresses. In this type of memory management, any attempt to access data that is not present in physical (system) memory causes the PMMU to send an interrupt signal to the central processing unit (CPU); the operating system then transfers the data in from other storage (such as hard disk), without the application "knowing" about the transfer.

In one virtual memory scheme, there is only one mapping from virtual memory space to physical memory space. In other implementations however, there can be several address spaces, each with its own mapping to the physical address space. Thus, a first process may refer to a given physical address using a first virtual address and a second process running on the same CPU, or on a different CPU in a multi-processor environment, will refer to the given physical address by a second virtual address. In such a case, the two virtual addresses corresponding to the same physical address are referred to as aliases.

Some CPUs are able to operate using more than one size of virtual page. This permits the virtual page size used in a mapping to be selected to best meet the needs of the virtual address space being mapped. If one uses big pages, a large amount of virtual memory can be translated using a single entry in the MMU. Therefore, fewer resources are needed for the MMU thereby increasing performance. The use of big pages can, however, lead to memory fragmentation problems not encountered when small pages are used.

SUMMARY OF THE INVENTION

A method and apparatus for translating a virtual address to a physical address is disclosed. A virtual address to be translated has a virtual page offset and a virtual page number. The virtual address to be translated addresses a page of memory. The size of this page is unknown. The unknown page size is one of L different possible page sizes where L is a positive integer greater than one.

Each of the L different page sizes is selected to be a test page size and a test is performed. During the test, a pointer into a translation storage buffer is calculated. The pointer is calculated from the virtual address to be translated by assuming that the virtual address to be translated corresponds to a mapping of the test page size. The pointer points to a candidate translation table entry of the translation storage buffer. The candidate translation table entry has a candidate tag and candidate data. The candidate tag identifies a particular virtual address and the candidate data identifies a particular physical address corresponding to the particular virtual address.

A virtual address target tag is extracted from the virtual address to be translated. The virtual address target tag is calculated by assuming that the virtual address to be translated corresponds to a mapping of the test page size. The target tag and the candidate tag are then compared. If the target tag matches the candidate tag, the candidate data is provided as the physical address translation corresponding to the virtual address to be translated.

BRIEF DESCRIPTION OF THE DRAWINGS

The features, and advantages of the method and apparatus of the present invention will be apparent from the following detailed description of the invention in which.

DETAILED DESCRIPTION OF THE INVENTION

A method and apparatus for implementation of a virtual address to physical address translation cache that supports multiple page sizes is disclosed. In an embodiment described below, hardware provides support for a software search of the translation cache by calculating the tag value to be compared and the pointers into the cache where the comparison is to be made. The hardware support described is simple to implement and efficient. If a translation exists within the translation cache, the translation can be performed by retrieving one translation entry. Because the embodiment permits the translation to be retrieved from the cache by software, frequently used portions of the translation cache can themselves, be cached in a virtually-indexed data cache.

Moreover, in an embodiment that uses a software implemented search structure, great flexibility in the structure of the translation cache can be achieved. Thus, the translation cache can be configured to be one cache that intermixes translations for different page sizes or configured as one cache divided into sub caches wherein each sub cache contains translations for a single page size. Multiple translation caches can also be employed. Therefore, in one embodiment, separate translation caches can be provided, one for instructions and the other for data. Alternate embodiments can also be implemented wherein there is one global translation cache for all CPUs and contexts; one translation cache per CPU, with each translation cache containing all contexts; one translation cache per context, but shared by all CPUs, or one translation cache per context per CPU. Finally, an embodiment can be implemented where system translations are treated as a separate context thereby permitting separate translation caches for user translations and for system translations.

In the following description, for purposes of explanation, specific numbers, materials and configurations are set forth in order to provide a thorough understanding of the present invention. It will be apparent to one skilled in the art, however, that the present invention may be practiced without the specific details. In other instances, well known systems are shown in diagrammatic or block diagram form in order not to obscure the present invention unnecessarily.

Figure 1:
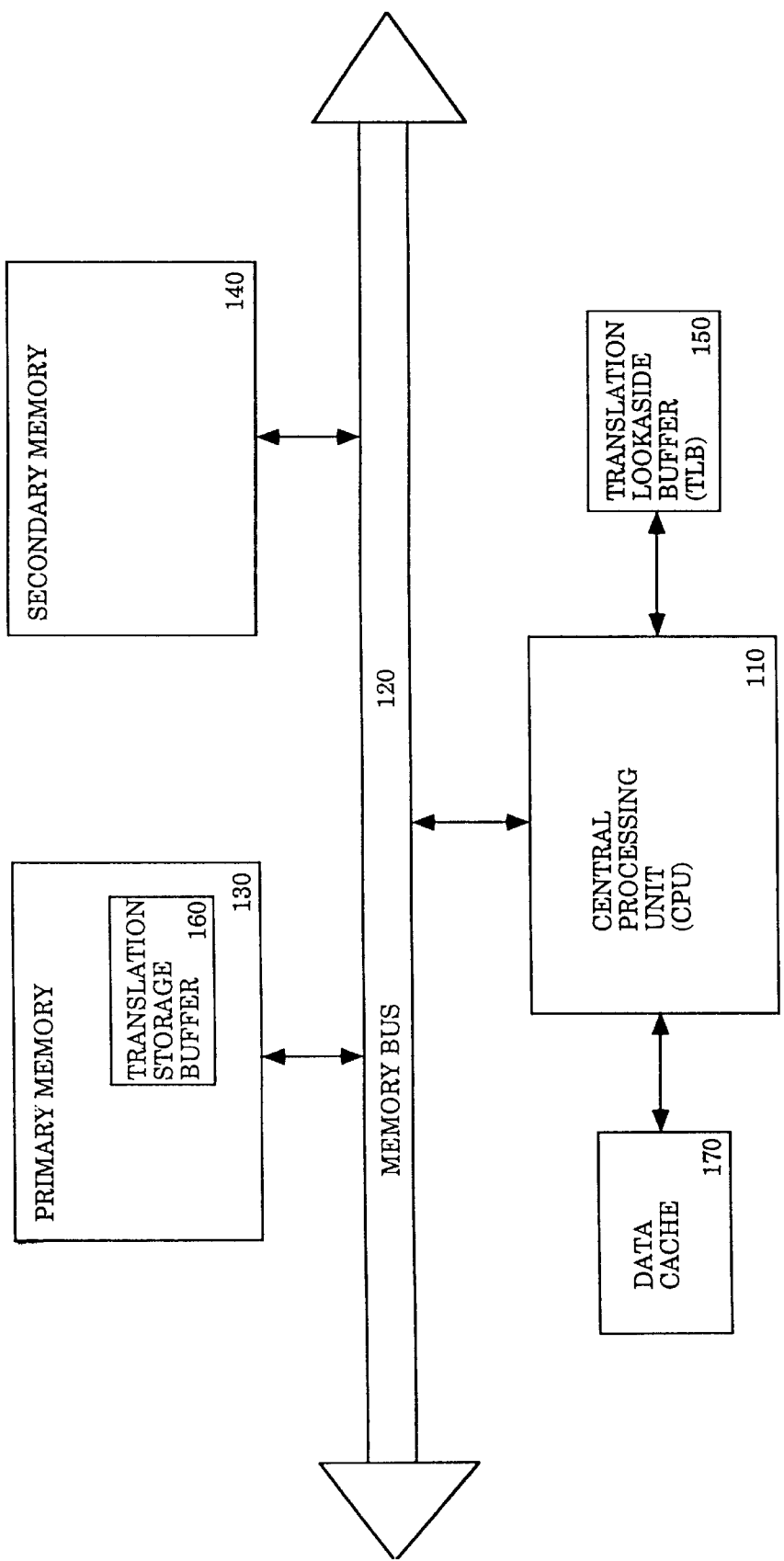
FIG. 1 illustrates a computer system that uses an embodiment of the present invention to perform address translation from a virtual address to a physical address.

Referring now to FIG. 1, an embodiment of a virtual memory computer system is illustrated that uses a virtual address (VA) to physical address (PA) translation cache that supports multiple page sizes. In computer system 100 of FIG. 1, central processing unit (CPU) 110 is coupled to primary memory 130 and secondary memory 140 by a memory interconnect such as memory bus 120. In an embodiment of computer system 100, central processing unit 110 can access primary memory 130 faster than it can access secondary memory 140. Secondary memory 140, however, is much larger, and therefore can hold more data, than primary memory 130. In this embodiment, secondary memory 140 is divided into pages and the pages are swapped in and out of primary memory 130 as they are needed by central processing unit 110. In this way, central processing unit 110 can access more memory than is available in primary memory 130 at a speed that is roughly the same as if all of the memory in secondary memory 140 could be accessed with the speed of primary memory 130.

Central processing unit 110 is supported by a data cache 170. Data cache 170 is smaller than primary memory 130 but can be accessed faster than can primary memory 130. Thus, when central processing unit 110 needs data, data cache 170 is first checked to determine whether the data is available there. If the data is not available in data cache 170, then primary memory 130 is checked to determine whether primary memory 130 includes a page that contains the required data. If primary memory 130 does not have the required data, then a page containing the required data is copied into primary memory 130 from secondary memory 140 so that it can be accessed by central processing unit 110. At least part of the required data will also be copied into data cache 170 so that it can be accessed quickly by central processing unit 110.

When a process executing within central processing unit 110 requires data, the process will specify the required data using a virtual address. Translation lookaside buffer (TLB) 150 is a hardware device that contains virtual address to physical address translation information for a small set of recently, or frequently, used virtual addresses. Because TLB 150 is implemented in hardware, it can quickly provide central processing unit 110 with a physical address translation of a requested virtual address. TLB 150, however, contains translations for only a small set of virtual addresses. If TLB 150 cannot provide the address translation requested by central processing unit 110, then translation storage buffer 160 is checked to see if it can provide the address translation requested.

Translation storage buffer 160 contains more address translations than does TLB 150. Because translation buffer 160 is stored in primary memory 130, it cannot be accessed by central processing unit 110 as quickly as can TLB 150. On the other hand, because translation storage buffer 160 is larger than TLB 150, TSB 160 provides more opportunities to find the requested address translation than does TLB 150.

Furthermore, because TSB 160 resides in primary memory 130, it can be treated by system 100 as any other memory object and therefore all, or part of TSB 160 can migrate into data cache 170. Thus, if TLB 150 cannot provide a physical address translation of a virtual address for CPU 110, there is a good chance that CPU 110 will find the requested translation in TSB 160. Moreover, there is also a good chance that the portion of TSB 160 that contains the requested translation will reside in data cache 170. Thus, TSB 160 will often enable the desired virtual address to physical address translation to be provided quickly to central processing unit 110 in cases where the requested translation cannot be provided by TLB 150.

Figure 2:
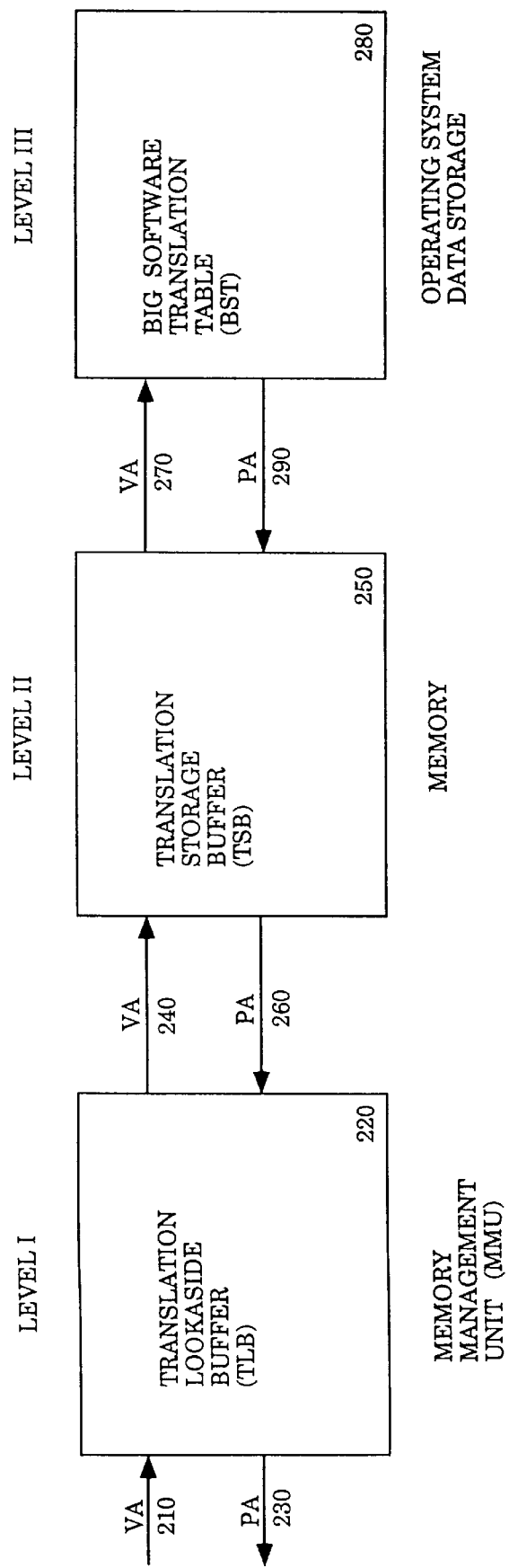
FIG. 2 illustrates a multi-level approach for translating virtual addresses to physical addresses.

Referring now to FIG. 2, a hierarchical translation structure for one embodiment of the present invention is depicted. In FIG. 2, a three-level translation hierarchy is illustrated. Whenever a CPU requires a virtual address to be translated to a physical address, a translation attempt will be made at Level I. In FIG. 2, Level I is depicted as being a memory management unit (MMU) such as translation lookaside buffer (TLB) 220. Level I is typically implemented in hardware, and is characterized by providing a fast translation for a small number of addresses. The set of addresses that can be translated at Level I changes dynamically with elements of the set being updated in order to insure that the most likely needed translations will be available at Level I.

Level II is exemplified in FIG. 2 by translation storage buffer (TSB) 250. In an embodiment of the present invention, TSB 250 is implemented in primary memory. Therefore, TSB 250, while not as fast as TLB 220, can maintain a larger set of translation elements than can TLB 220. Thus, when TLB 220 is unable to provide a translation (a TLB "miss"), TSB 250 is tested to determine whether the translation is stored in TSB 250. If the translation can be provided by TSB 250 (a TSB "hit") then the translation is provided to the CPU and to the translation lookaside buffer 220. If, on the other hand, TSB 250 cannot provide the translation (a TS3 "miss") then a Level III translation is performed.

A Level III translation is characterized by being slow but also as being comprehensive. Typically, the virtual memory operating system will provide a big software translation table (BST) 280 that is stored in data storage. The data storage can be primary memory, secondary memory or a combination of primary and secondary memory. BST 280 contains every translation from virtual address space to physical address space that exists. Therefore, while a Level III translation will take a relatively long time, it will result in a translation being found if one exists. When a Level III translation is made, the results are provided to the CPU, to the translation storage buffer 250 and to the translation lookaside buffer 220.

To summarize FIG. 2, a Level I translation is performed when the CPU generates a virtual address request (210) to a Level I translator such as TLB 220. If the Level I translation is successful (a hit), the Level I translator will provide the requested physical address (230) that corresponds to the requested virtual address 210.

If the Level I translation fails (a miss), then a virtual address request 240 will be made to the Level II translator such as TSB 250. If the Level II translation is successful, then the physical address 260 corresponding to the virtual address request 240 will be returned to the Level I translator (TLB 220) and then to the CPU (physical address 230).

If, on the other hand, the Level II translation fails, then virtual address request 270 will be sent to a Level III translator such as BST 280. Because BST 280 is comprehensive, if a physical address translation exists, it will be returned to the Level II translator (TSB 250) as physical address 290. The translation will also be provided to the Level I translator (TLB 220) as physical address 260 and will ultimately be provided to the CPU as physical address 230.

While the present invention is being described herein in an example embodiment containing three levels of translation, alternate embodiments exist that contain more, or less, levels of translation. Furthermore, while the present invention is described in an embodiment of a Level II translation storage buffer such as TSB 250, an alternate embodiment of the present invention would be one wherein a translation storage buffer was used as a Level I translator.

Figure 3:
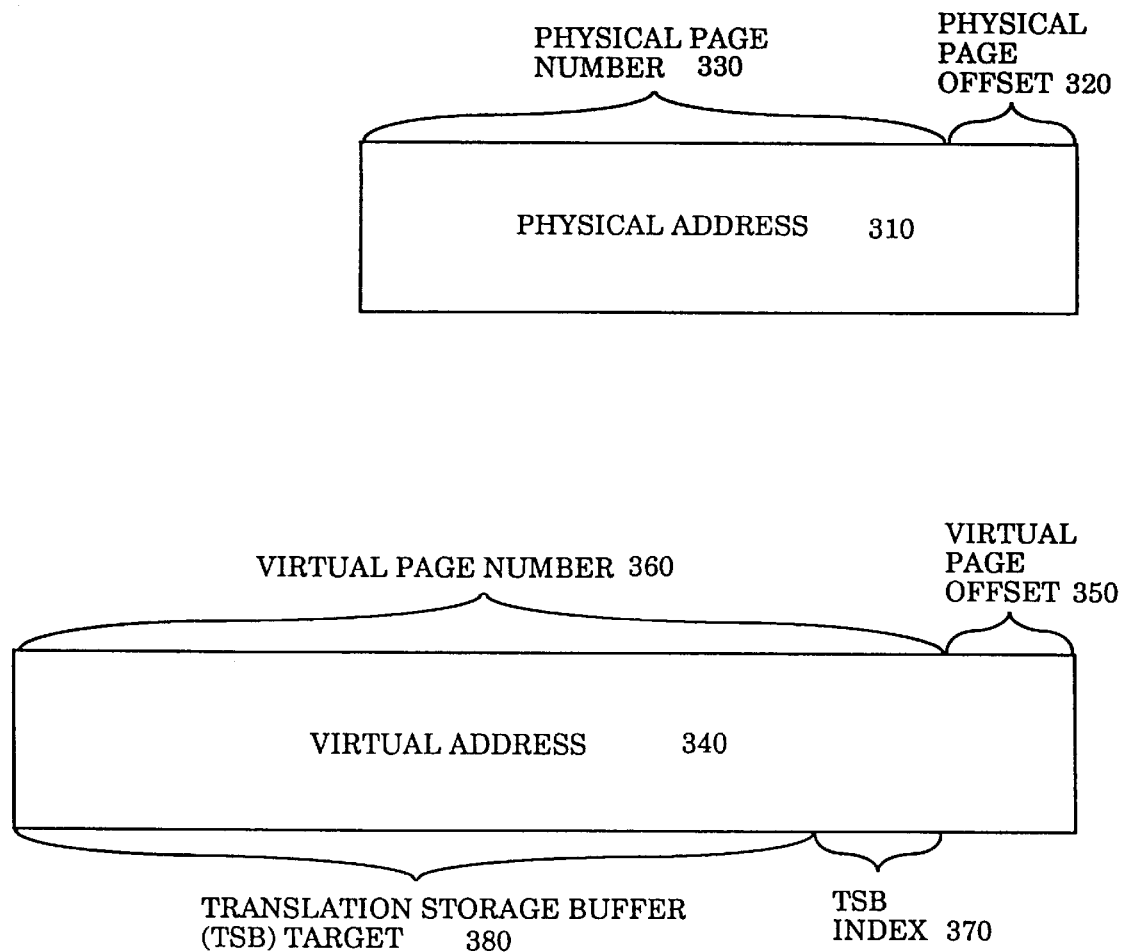
FIG. 3 illustrates the relationship between physical addresses and virtual addresses and how a translation storage buffer index and target are derived from a virtual address.

Referring now to FIG. 3, the relationship between physical and virtual addresses is depicted. FIG. 3 further illustrates the derivation of a translation storage buffer index and target. In FIG. 3, physical address 310 is depicted as being comprised of a physical page offset 320 and a physical page number 330. A physical page is a contiguous portion of physical primary memory. Conceptually, the physical page can be thought of as being divided into a set of "rows" wherein a row represents the smallest set of data that can be addressed individually. Physical page offset 320 then specifies the row being addressed within a given physical page and physical page number 330 specifies which page from the set of physical pages is being selected.

Physical pages can be of varying sizes. Thus, a big page will have more rows than a small page. It follows that a given amount of physical memory can be divided into fewer big pages than can be divided into small pages. Therefore, more bits of physical address 310 will be devoted to physical page offset 320 for a big page than for a small page. Correspondingly, fewer bits of physical address 310 will be devoted to physical page number 330 for a big page than for a small page. If the number of rows in a given page is constrained to be an integral power of two, and if the maximum number of physical pages for a given page size is also constrained to be an integral power of two, then it follows that the physical address 310 can be represented as an M+N bit binary number wherein M bits of physical address 310 are used to designate physical page number 330 and N bits of physical address 310 are used to designate physical page offset 320.

In one embodiment, a 40 bit physical address space is used and is mapped using small pages that are 8 KB in size and big pages that are 64 KB in size. In this embodiment, physical address 310 is a 40 bit binary number. When a small (8 KB) page is being addressed, the 13 least significant bits (LSbs) of physical address 310 will represent physical page offset 320. The 27 most significant bits (MSbs) of physical address 310 will specify the physical page number 330 for a given small page. If, on the other hand, a large (64 KB) page is being used, the 16 least significant bits of physical address 310 will be used to provide the physical page offset 320 for the big page. In the case of big pages, the 24 MSbs of physical address 310 will be used to specify a given physical page number 330 for a given big page.

Referring now to virtual address 340, it can be seen that virtual address 340 is divided into a virtual page offset 350 and a virtual page number 360 in a manner similar to the division of physical address 310. For a given page size, the virtual page offset 350 will equal the physical page offset 320. Virtual memory techniques are typically used to map a larger virtual address space into a smaller physical address space, so that for a given page size, there will usually be more virtual pages than physical pages. In an example embodiment, virtual address 340 is a 64 bit binary number representing a virtual address space of size $2^{64}$. In the case where a small page of size 8 KB is used, virtual page offset 350 will be the 13 LSbs of virtual address 340 and virtual page number 360 will be the 51 MSbs of virtual address 340. Similarly, in the case where a big page of size 64 KB is used, virtual page offset 350 will be the 16 LSbs of virtual address 340 and virtual page number 360 will be the 48 MSbs of virtual address 340. Throughout the rest of the detailed description, unless otherwise noted, an example embodiment having a 40 bit physical address space, a 64 bit virtual address space and big and small page sizes of 64 KB and 8 KB, respectively will be described. In alternate embodiments, different sizes can be used for the virtual and physical address spaces, as well as for the big and small pages. Furthermore, an alternate embodiment exists wherein more than two page sizes can be used. Moreover, alternate embodiments exist where there is a larger physical address space than virtual address space.

In one embodiment of the present invention, a direct-mapped translation storage buffer is used to provide virtual address to physical address translations. In this embodiment, the translation storage buffer contains translation table entries (TTEs). Each TTE provides a particular translation from a virtual address to a physical address. If the translation storage buffer is constrained to contain a positive integral power of two number of TTEs, then an N bit TSB index 370 can be used to directly map into the TSB buffer where N is the base two logarithm of the number of entries of the TSB. Therefore, in an example embodiment wherein a translation storage buffer having 512 entries is employed, the index into the translation storage buffer can be represented by a 9 bit binary number.

Conceptually, the virtual page number 360 can be divided into two fields. The first field is the N least significant bits of the virtual page number 360 and is the TSB index 370. The second field is the remaining most significant bits of virtual page number 360. This field is a translation storage buffer target 380. Target 380 can be used to determine whether the TTE entry stored at the location specified by TSB index 370 is the TTE for the given virtual address 340. Thus, in the case of a 512 entry TSB, the 9 LSbs of a virtual page number 360 for a given virtual address 340 will provide TSB index 370. The remaining MSbs of the virtual page number 360 will provide the translation storage buffer target 380.

The problem with the above described TSB indexing scheme is that at the time that a virtual address is to be translated, the page size corresponding to the virtual address space of the virtual address to be translated will not be known. Because the page size will not be known, it cannot be determined which part of virtual address 340 is devoted to virtual page offset 350 and which part is devoted to virtual page number 360. This is a problem because TSB index 370 is defined to be a known number of least significant bits of virtual page number 360, but without knowing the page size, the least significant bits of virtual page number 360 cannot be determined. The solution to this dilemma is to calculate the TSB index 370 and TSB target 380 for each possible page size and then, for each page size, check the TTE corresponding to the TSB index for that page size against the TSB target until a TSB hit is found. If no hit is found after checking the TTE corresponding to the TSB index for each page size, then the TSB does not contain the requested translation and a higher level translator (e.g. BST) is employed.

Figure 4:
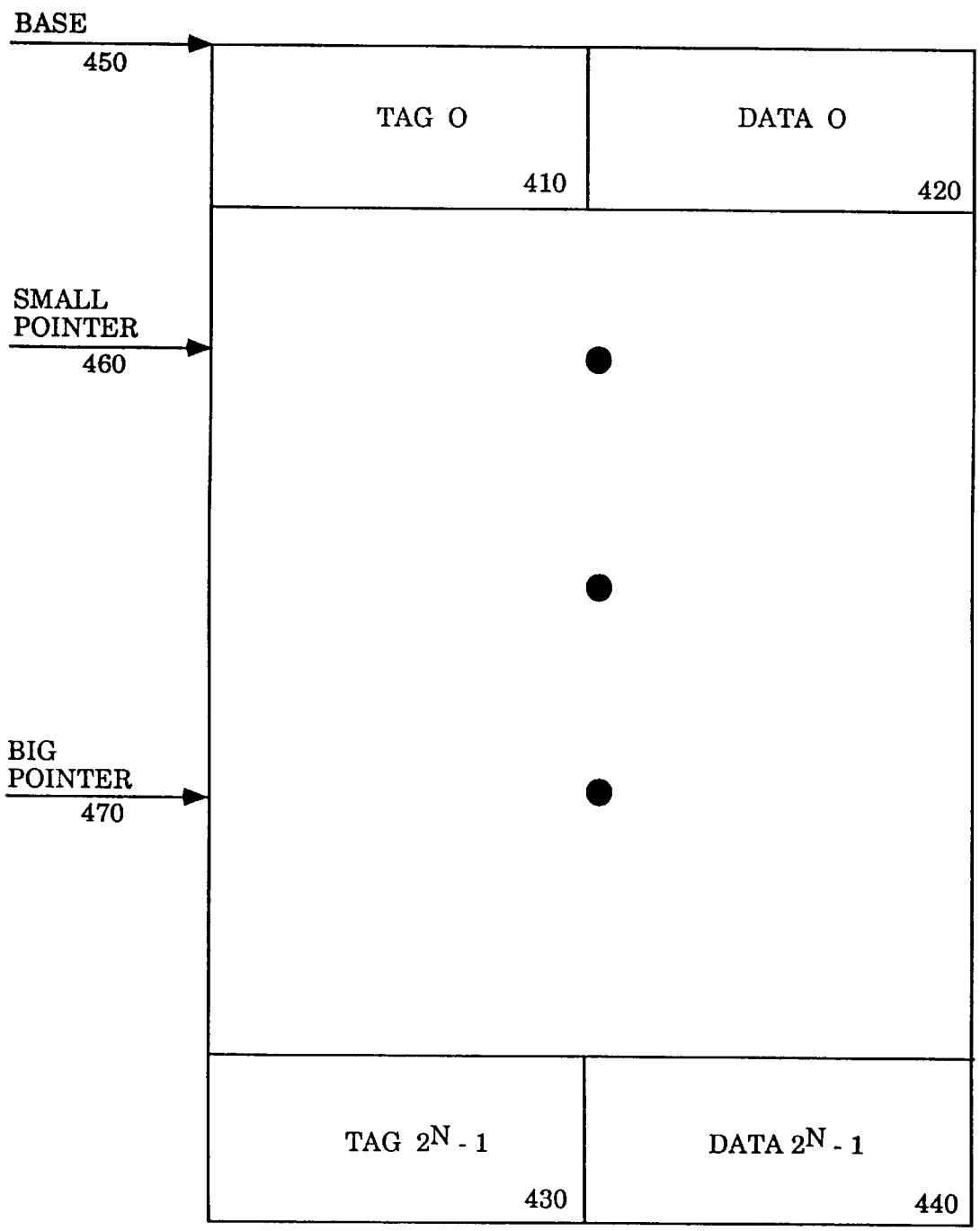
FIG. 4 illustrates an embodiment of a translation storage buffer that supports multiple page sizes.

Referring now to FIG. 4, a translation storage buffer that intermixes translation table entries for big and small sized pages is illustrated. In FIG. 4, it can be seen that translation storage buffer 400 is a contiguous set of memory containing a $2^N$ element array of translation information. Thus, tag 0 410 and data 0 420 together represent the first translation table entry of TSB 400 and tag $2^N$-1 430 and tag data $2^N$-1 440 together represent the last translation table entry of TSB 400.

When a TTE is tested, the tag field of the candidate TTE is compared to the tag field being sought. If they do not match, then the TTE does not correspond to the virtual address to be translated. If, on the other hand, the tag of the candidate TTE matches the tag calculated from the virtual address to be translated, then the physical address for the virtual address to be translated can be found in the corresponding data field of the candidate TTE and a TSB hit has occurred.

Thus, if the TTE containing tag 0 410 and data 0 420 were being tested, a comparison would be made between the translation storage buffer target corresponding to the virtual address to be translated and tag 0 410. If tag 0 410 matched the translation storage buffer target of the virtual address to be translated, then the information stored in data 0 420 would provide the physical address for the virtual address to be translated.

As described above, in the case where there is a translation storage buffer 400 that maps two page sizes (small and big), then two entries of TSB 400 will be checked to see if there is a hit. Small pointer 460 will point to the candidate TTE of TSB 400 to be tested to determine whether a hit has occurred for a small page size virtual address and big pointer 470 will point to the candidate TTE of TSB 400 to be used to determine whether a TSB hit has occurred for the case where the virtual address to be translated is a big page size virtual address.

Base 450 points to the start of the translation storage buffer 400. Because the size of each TTE is known, a pointer into TSB 400 can be calculated for a given TSB index by adding the base 450 address to the product of the TSB index and the size of an individual TTE. Because base 450 can be specified as a virtual address, the pointers into the translation storage buffer can also be virtual addresses. The entire translation storage buffer 400 can be stored in virtual memory just as can any other memory object. Therefore, as mentioned above, in an embodiment of a computer system that has a data storage cache, all, or part, of TSB 400 will migrate in and out of the data storage cache. When the candidate TTEs of TSB 400 are available in the data cache, the look-up of the translation storage buffer will be very fast.

In the case where TSB 400 is virtually indexed, recursive virtual address translations will be required since the pointers used to access TSB 400 will themselves need to be translated from virtual to physical addresses. Recursive virtual address translations can be provided in many ways. In one embodiment, the translation information for the virtual addresses of the pointers to the TSB are stored in an entry of the translation lookaside buffer that is locked into the TLB so that the pointer translations will always be available within the translation lookaside buffer.

Multiple TSBs can be implemented thereby effectively providing a set-associative TSB. In a set-associative TSB embodiment, there is at least one additional translation storage buffer like TSB 400. In this embodiment, big and small pointers are calculated for each TSB and one TTE per TSB is checked for each page size. If an additional TSB is appended to TSB 400, the big pointer to the additional TSB is calculated by adding the size of TSB 400 to the big pointer of TSB 400. Similarly, the small pointer to the additional TSB is calculated by adding the size of TSB 400 to the small pointer of TSB 400.

Figure 5:
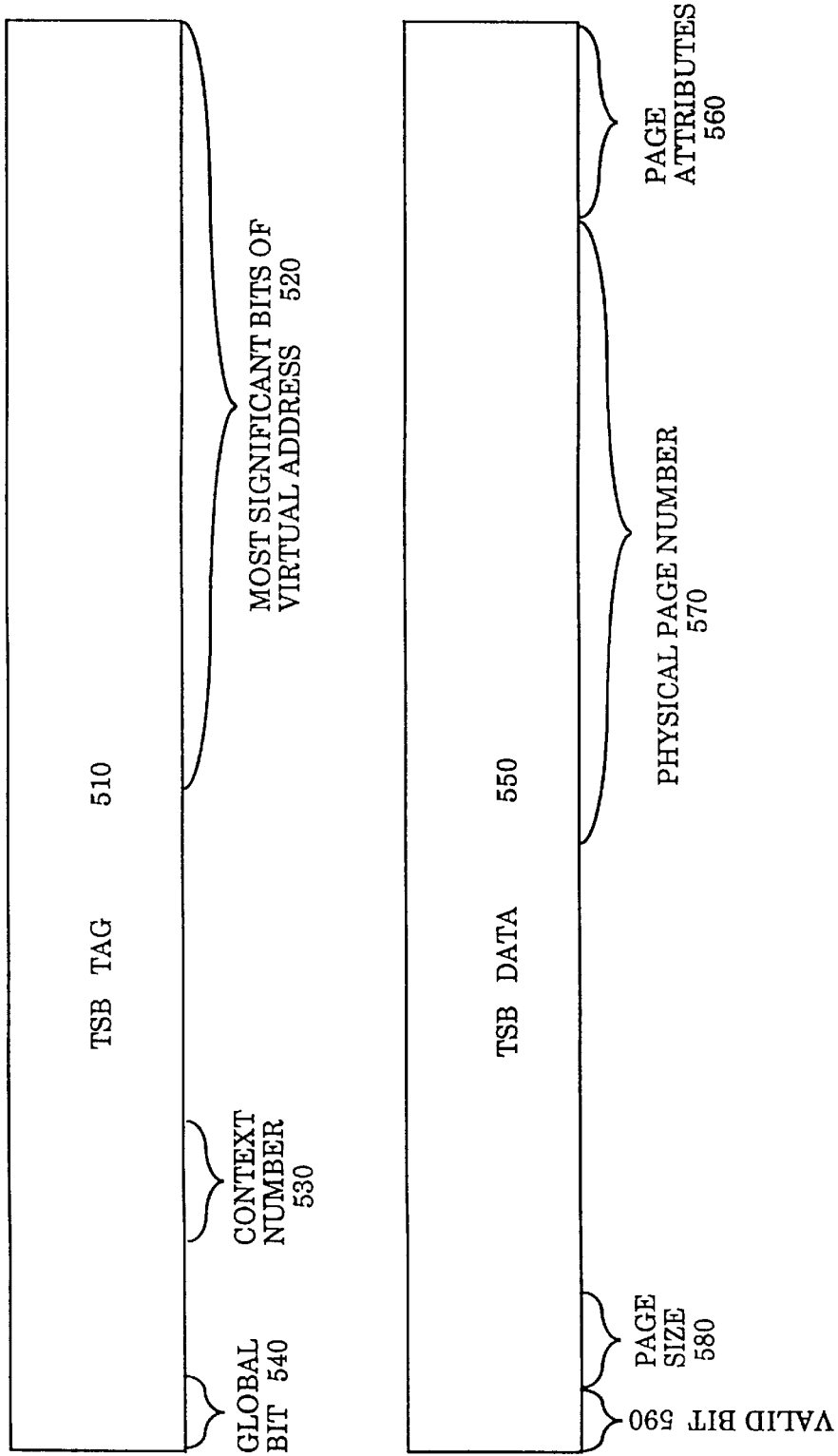
FIG. 5 illustrates a translation table entry within a translation storage buffer.

Referring now to FIG. 5, a sample translation table entry of a translation storage buffer is illustrated. In FIG. 5, it can be seen that translation table entry 500 is divided into two parts, TSB tag 510 and TSB data 550. TSB tag field 510 contains all of the information necessary to determine whether the translation table entry 500 corresponds to the virtual address to be translated. TSB data field 550, on the other hand, provides all of the information necessary to translate the virtual address to be translated into a physical address.

Referring now to TSB tag 510, it can be seen that TSB tag 510 is comprised of three fields. The first field contains the most significant bits of the virtual address 520 for the virtual address that is translated by TTE 500. The minimum number of most significant bits of the virtual address to include in field 520 can be calculated by subtracting the sum of the number of bits in the page offset for the smallest page mapping and the number of bits required to specify the TSB index from the total number of bits in the virtual address. Thus, in the example where the smallest page size to be mapped is 8 KB, there is a 512 translation table entry (TTE) TSB, and a 64 bit virtual address space, the 42 most significant bits (64−(13+9)) of the virtual address corresponding to TTE 500 will be stored in field 520. Note that, in this example, if the big page size is 64 KB, then only the 39 most significant bits (64−(16+9)) of the virtual address are required to determine a match for a big page. So long as the number of bits in the page offset for the biggest page does not exceed the sum of the number of bits for the page offset of the smallest page and the number of bits required to represent the virtual index, there is no harm in including "extra bits" of the most significant bits for the big pages. The advantage of doing so is that under these circumstances, only one TSB tag need be calculated for the virtual address to be translated and that one TSB tag can be compared against a candidate TSB tag for each page size. In alternate embodiments that violate this constraint, one can calculate one TSB tag per page size to compare against the corresponding candidate TSB tag for that page size.

In the TTE embodiment of FIG. 5, each context can have a separate virtual address space or, alternatively, some contexts can use the same virtual address space thereby providing a "global" virtual address space. Global bit 540 is used to specify whether translation table entry 500 is context specific or not. If global bit 540 is set, then a hit will occur whenever field 520 matches the most significant bits of the virtual address to be translated regardless of the context requesting the translation. If, on the other hand, global bit 540 is not set, then the virtual address corresponding to translation table entry 500 is context specific and a hit will only occur if field 520 matches the most significant bits of the virtual address to be translated and the value stored in context number field 530 matches the context number for the context requesting the virtual address to be translated.

Referring now to TSB data field 550, TSB data 550 includes page attributes field 560, physical page number field 570, page size field 580, and valid bit 590. Physical page number field 570 contains the physical page number corresponding to the virtual address translated by TTE 500. Physical page number 570 is a field that has as many bits allocated to it as are required to specify the physical page number for the smallest page size being used in the mapping. Thus, in the case where the physical address space is specified by 40 bits, and the smallest physical page mapping is an 8 KB page, physical page number field 570 will be 27 bits in size (40–13). In the case where translation table entry 500 corresponds to a mapping for a page size bigger than the smallest page size mapping, only the appropriate number of most significant bits of physical page number field 570 are used to contain the physical number for the translation table entry and the remaining least significant bits are ignored. Thus, in the case where a 64 KB page was being translated and the smallest page size was 8 KB, only the 24 most significant bits of physical page number field 570 would be needed to specify the physical page number for the translation and the remaining three least significant bits of physical page number field 570 would be ignored.

In the translation table entry 500 embodiment of FIG. 5, the least significant bits of TSB data 550 are used to store page attributes 560 for the page being translated. Examples of page attributes are bits that indicate whether the page of the translation can be cached or whether the page has read/write or read only privileges.

TSB data field 550 also includes a page size field 580. In this embodiment, the two mappings being used are chosen from a universe of four possible page sizes. Therefore, in this embodiment, page size field 580 is two bits in size and can be used to specify the page size of the four possible page sizes corresponding to the page of translation table entry 500.

Finally, TSB data field 550 has a valid bit 590 that is the most significant bit of TSB data field 550. If valid bit field 590 is set, then the translation stored in TTE 500 is valid and can be used. If, on the other hand the valid bit 590 is not set, then the translation table entry 500 is not valid and cannot be used to provide a translation. As will be discussed below in connection with FIG. 9, by placing the valid bit in the most significant bit of TSB data field 550, this embodiment exploits the fact that the sign of an integer number is specified in the most significant bit of a representation of the number. As will be seen, a branch on negative instruction can be used to efficiently branch when a valid translation has been found in the translation storage buffer.

Figure 6:
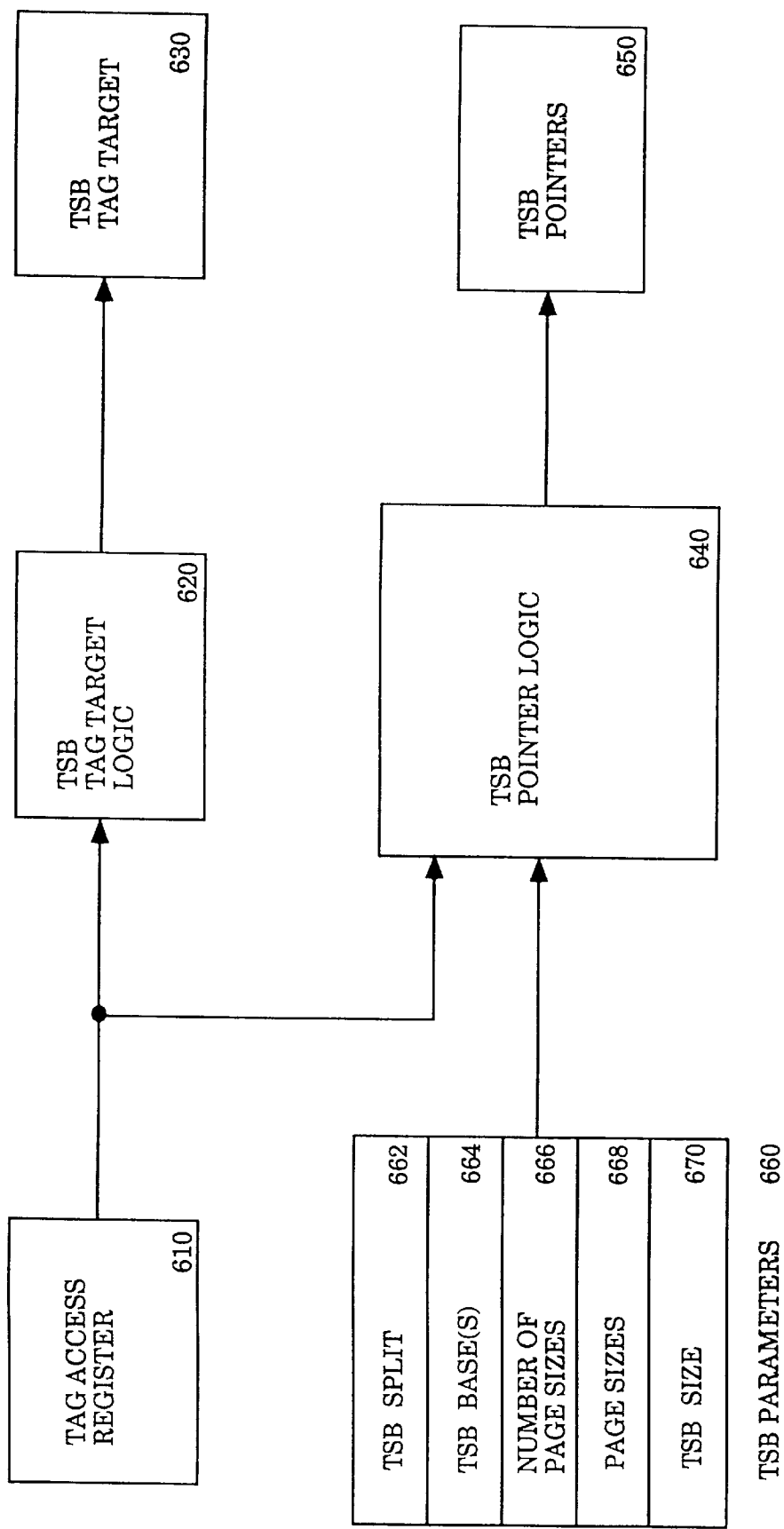
FIG. 6 illustrates the use of hardware logic by the present invention to quickly derive a tag target and translation storage buffer pointers.

Referring now to FIG. 6, hardware that is used in one embodiment to provide the TSB tag target and TSB pointers is illustrated. In FIG. 6, tag access register 610 is a register that contains the context number of the context requesting a virtual address to be translated and the most significant bits of the virtual address to be translated that are required by the translation storage buffer lookup. Thus, in the embodiment where the smallest page size is an 8 KB page, and the virtual address space is specified by 64 bits, the tag access register 610 is a 64 bit register that contains the 51 most significant bits of the virtual address to be translated in the 51 most significant bits of the tag access register 610. In this embodiment, because a context number can be represented in 13 bits or less, the 13 least significant bits of tag access register 610 are used to store the context number that requested the virtual address translation.

In the case where the translation storage buffer lookup is being performed after failure of a translation lookaside buffer lookup, tag access register 610 would be filled by the translation lookaside buffer when it requested a translation storage buffer lookup be performed. If, on the other hand, the translation storage buffer were being used as a Level I translator, then tag access register 610 would be filled by the CPU requesting the address translation at the time that it requested the address translation. TSB tag target logic 620 is bit shifting logic that fills TSB tag target register 630 with a TSB tag target to be compared with the TSB tag of each translation table entry of the translation storage buffer to be checked.

In a similar manner, TSB pointer logic 640 takes the value stored in the tag access register 610 and calculates one TSB pointer per page size. The TSB pointers are then stored in TSB pointers register 650. In order to perform the calculation of the TSB pointers, TSB pointer logic 640 is supplied with TSB parameters 660. The values stored in TSB parameters 660 are set at the time that the operating system is initialized. In an alternate embodiment, the parameters are dynamic and are changed as changes are needed. For example, the values of the TSB parameters can be changed during a context switch. By storing the information for the TSB parameters 660 in registers, a high degree of flexibility can be maintained in structuring the TSB. This flexibility permits the TSB to be tuned so that it will operate most effectively for a particular computer system implementation.

In the embodiment described in FIG. 6, the TSB parameters 660 that can be set at initialization include TSB split 662, TSB bases 664, number of page sizes 666, page sizes 668 and TSB size 670. The parameter TSB split 662 is a one bit parameter. When TSB split is set to zero, a translation storage buffer structure such as that of translation storage buffer 400 of FIG. 4 is established. In that structure, big and small page translation table entries are stored intermixed in the same translation storage buffer and the big and small pointers point to entries of the same translation table entry array.

Figure 7:
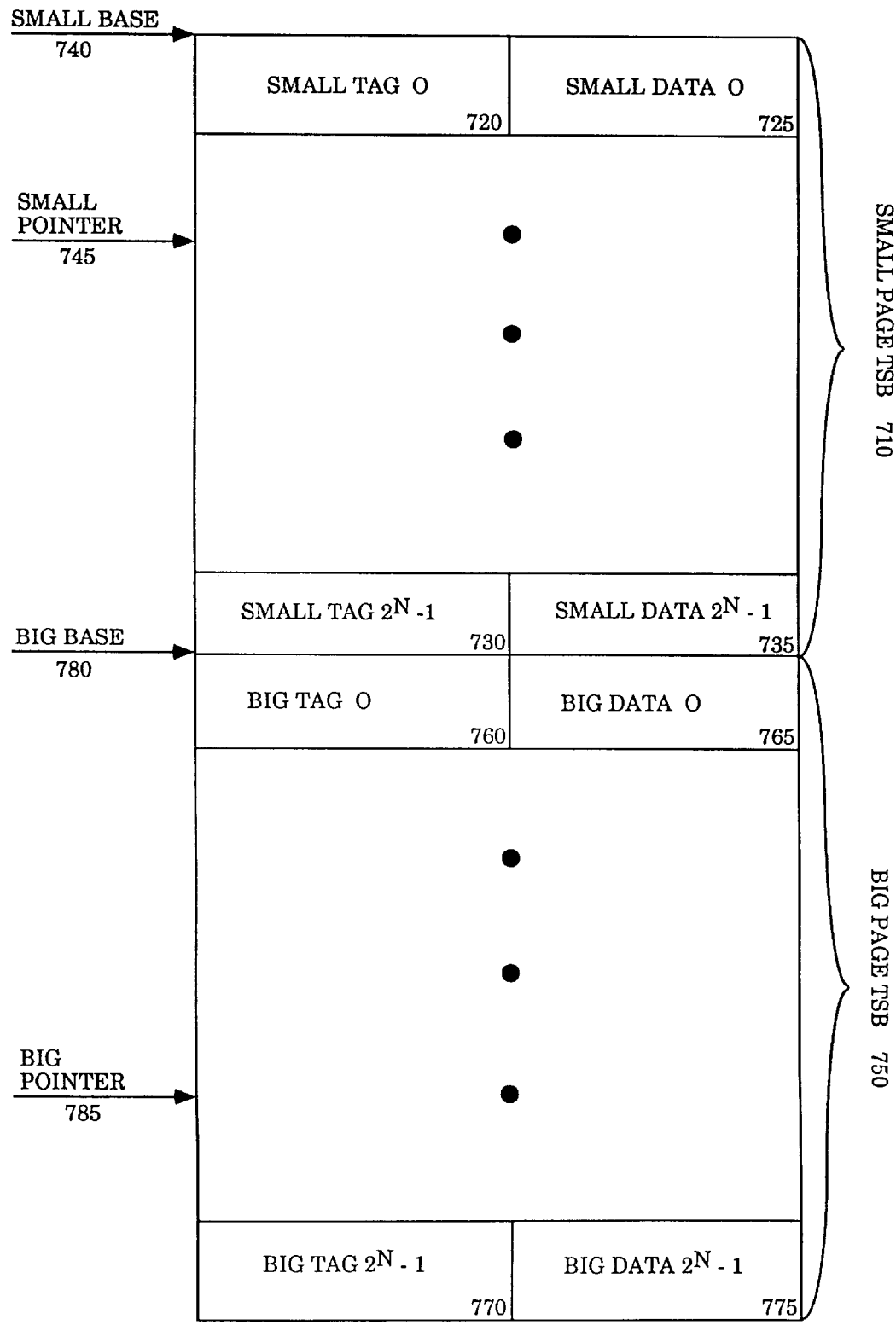
FIG. 7 illustrates an alternate embodiment of a translation storage buffer that supports multiple page sizes.

Referring now to FIG. 7, an alternate translation storage buffer 700 is depicted. This structure is implemented when the parameter TSB split 662 of FIG. 6 is set to equal one. The translation storage buffer 700 of FIG. 7 has been split or bifurcated into two separate sub translation storage buffers. There is a small page sub translation storage buffer 710 and a big page sub translation storage buffer 750. Small page sub translation storage buffer 710 has a base value small base 740 and a pointer small pointer 745 into the array of translation table entries for small pages. Similarly, big page sub translation storage buffer 750 has a base value of big base 780 and a pointer of big pointer 785 into the big page translation table entries.

An advantage of the structure of translation storage buffer 700 over the structure of translation storage buffer 400 is that when a hit is found in translation storage buffer 400, it is necessary to check the page size of the candidate before one can be sure that an actual hit was achieved. Translation storage buffer 700, on the other hand, has the page size included implicitly in the structure, therefore there is no need to check the page size after a candidate tag has been found to match the tag target. This is because small page translation table 710 is comprised only of translation table entries for small pages and big page translation storage buffer 750 is comprised only of translation table entries for big pages.

On the other hand, in some implementations the structure of translation storage buffer 400 can be more efficient that the structure of translation storage buffer 700. This is because, in some implementations, the need to translate virtual address may be dominated by either the small or big page size translations. In such a case, either small page sub TSB 710 or big page sub TSB 750 will be under-utilized while the other sub TSB is over-utilized. In such a case, one of the sub TSBs will be thrashing while the other will be accessed only infrequently.

Referring again to FIG. 6, by including the parameter TSB split 662, one can easily change the structure of the translation storage buffer to suit the needs of a particular system. If the number of page sizes parameter 666 is set to two, when TSB split parameter 662 is set to one, the split will occur into two sub TSBs. If, on the other hand, the number of page sizes parameter 666 is a number other than two, setting the TSB split parameter 662 will cause the TSB structure to be split into a corresponding number of sub TSBs.

Referring now to parameter TSB bases 664, if the TSB split has not been specified, only one TSB base will be stored in TSB bases 664. If, on the other hand, the TSB split has been specified, the bases for each of the sub TSBs will be stored as parameters in TSB bases 664.

The field page sizes 668 will store the actual sizes of the pages being translated. Thus, in the case where there are big and small pages, there will be two entries in page sizes 668, one entry will include the size of a big page and the other the size of a small page. In an alternate embodiment, the sizes could be implicit in hardware and therefore need not be stored in registers.

Finally, parameter TSB size 670 includes the number of entries in a particular translation storage buffer. In the case where translation storage buffer split parameter 662 has been set, TSB size will specify the number of entries in a sub TSB. In an alternate embodiment, there will be a separate TSB size for each sub TSB.

When provided with all of the information stored in TSB parameters register 660 and the tag access register 610, TSB pointer logic 640 can quickly calculate the TSB pointers to be used in a TSB lookup and store this information in TSB pointers register 650.

Figure 8:
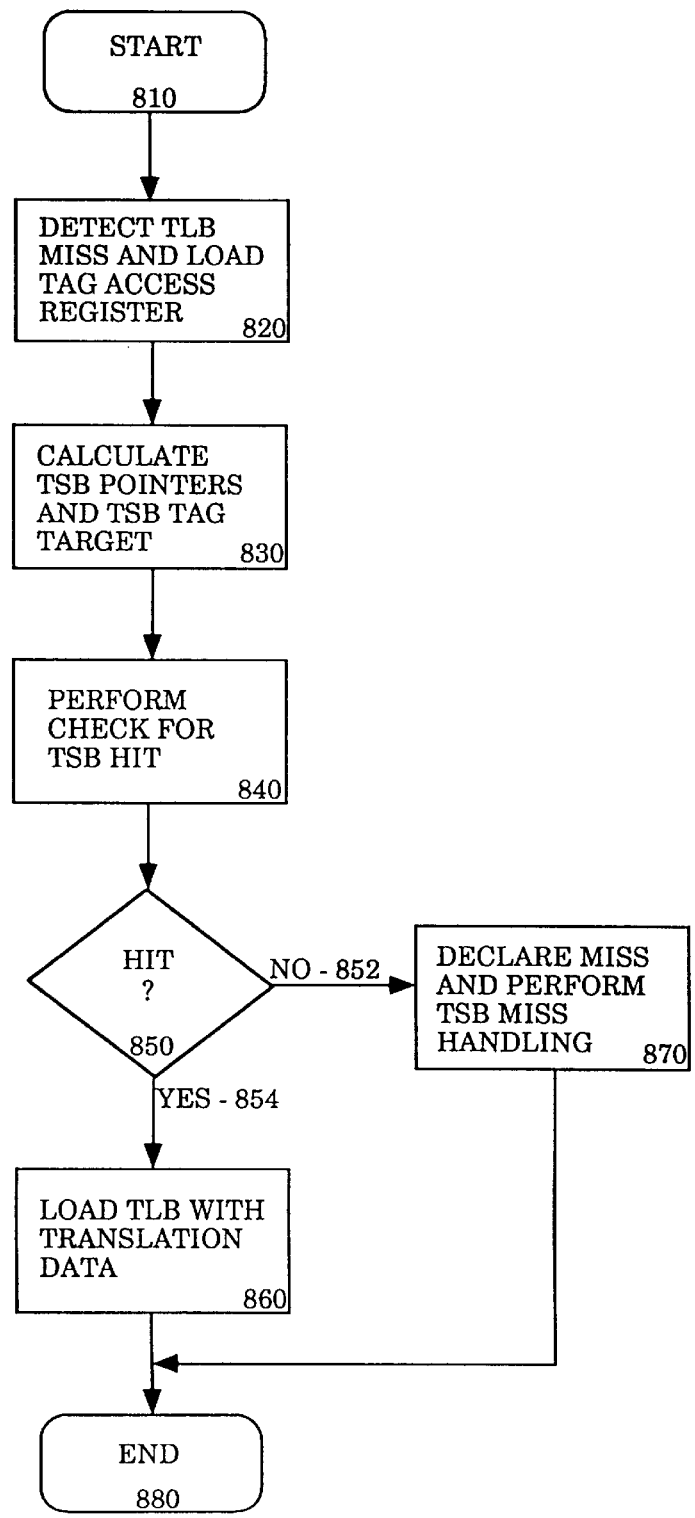
FIG. 8 is a flow chart illustrating a translation storage buffer look-up as performed by an embodiment of the present invention.

Referring now to FIG. 8, a flow chart that depicts an embodiment of a TSB lookup is illustrated. The TSB lookup process 800 begins at start bubble 810 and proceeds to process block 820 where a translation lookaside buffer miss is detected thereby causing the loading of the tag access register. In process block 830, the translation storage buffer pointers are calculated using the contents of the tag access register and the parameters that describe the TSB. The TSB tag target is also calculated in process block 830. In one embodiment, the TSB pointers and tag target are calculated by hardware as illustrated in FIG. 6. Alternately, the TSB pointers and tag target can be calculated by software.

Once the TSB pointers and tag target have been calculated, a process is performed in process block 840 to check to determine whether one of the translation table entries of the translation storage buffer pointed to by the TSB pointers contains the translation for the virtual address to be translated. An embodiment of a procedure for checking for TSB hits will be discussed below in greater detail in connection with FIG. 9.

Referring again to FIG. 8, after the check for TSB hit procedure has been performed in process block 840, a test is made in decision block 850 to determine whether or not a TSB hit occurred. If a hit occurred then decision path 854 is taken to process block 860 where the translation lookaside buffer is loaded with the translation data required to perform the virtual address to physical address translation requested.

Referring again briefly to FIG. 5, in one embodiment, the translation lookaside buffer has been structured so that it has a translation lookaside buffer tag and translation lookaside buffer data field for each translation entry of the TLB. In this embodiment, the translation lookaside buffer data field has the same structure as the translation storage buffer data field 550 of FIG. 5. Because the translation lookaside buffer tag field has information that is known at the time that the request was made for a translation, at the time that a translation lookaside buffer miss is detected, a tag register is filled with the contents of a translation lookaside buffer tag field formatted so that it will comply with the structure of a translation lookaside buffer tag. Then, if a TSB hit occurs, there is only a need to transfer the translation lookaside data field contents from the translation storage buffer. The translation lookaside buffer tag for the translation entry can be provided directly from the tag register of the translation lookaside buffer. Furthermore, because the translation storage buffer data field is formatted to be the same as that of the translation lookaside buffer data field, the translation information can be loaded into the translation lookaside buffer quickly since there is no need to reformat the field contents.

Once the translation lookaside buffer has been loaded with translation data in process block 860, then processing of the TSB lookup procedure 800 ends at terminal bubble 880.

Referring again to decision block 850, in the case where a TSB hit did not occur, then processing continues along decision path 852 to process block 870. In process block 870, a miss has occurred because the TSB does not contain the translation for the virtual address to be translated. Therefore, a TSB miss handling procedure is executed.

Referring briefly to FIG. 2, upon a TSB miss, the miss handling procedure will consult the big software translation table 280 managed by the virtual memory operating system to retrieve the address translation if it exists. Alternately, the miss handler could use a translator of an intermediate level between Level II and Level III before the Level III translator is consulted. An example of an intermediate level translator would be yet another translation storage buffer.

Figure 9:
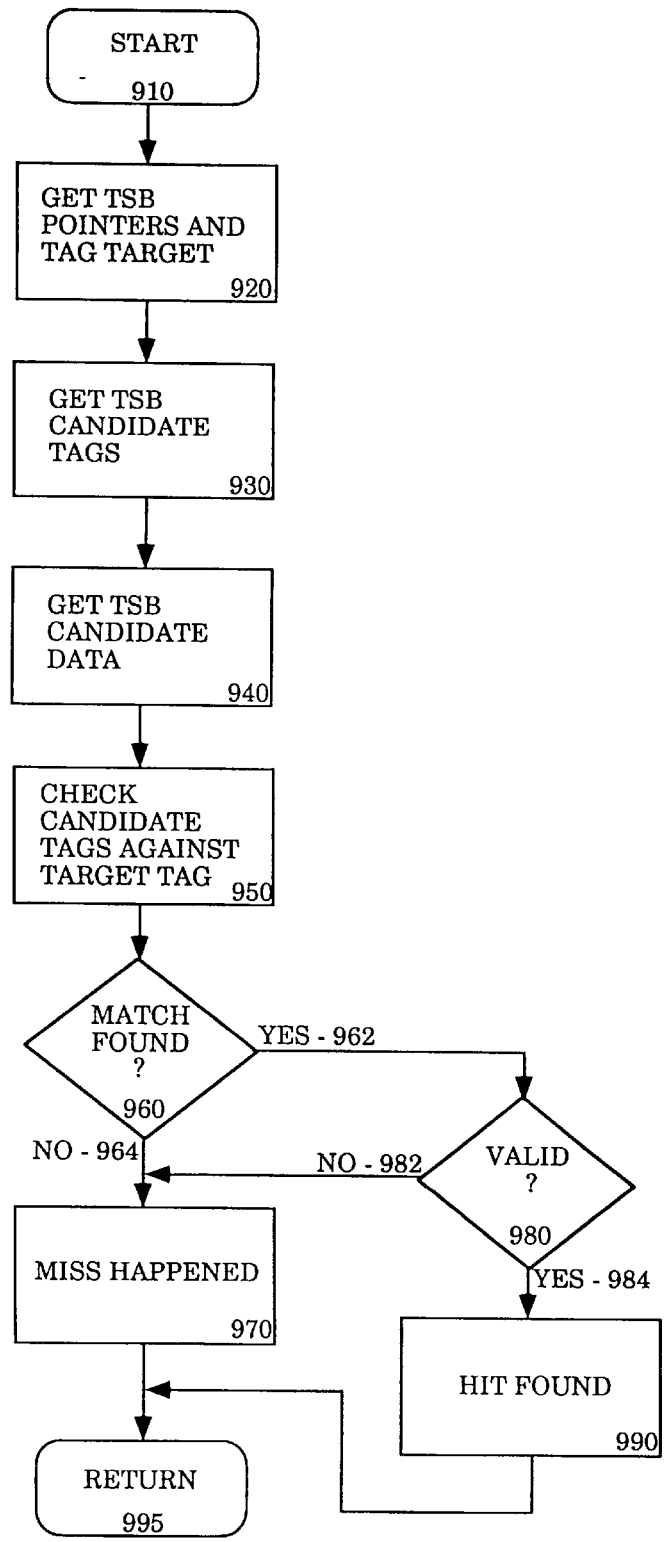
FIG. 9 is a flow chart of a procedure employed by an embodiment of the present invention to check for a translation storage buffer hit.

Referring now to FIG. 9, a flow chart is illustrated of a procedure that checks to determine whether a TSB hit has occurred. In FIG. 9, the procedure check for TSB hit 900 begins at start bubble 910 and proceeds to process block 920 where the translation storage buffer pointers and tag target are retrieved from their respective registers. Then, in process block 930, the translation storage buffer candidate tags stored in the translation storage buffer at the locations pointed to by the translation storage buffer pointers are retrieved. This is followed by the retrieval of the corresponding translation storage buffer candidate data in process block 940.

A candidate tag for each page size is tested against the target tag in process block 950. In decision block 960, a test is made to determine whether a match was found. If no match was found, then decision path 964 is taken to process block 970 where a miss is declared. Processing then completes at terminal bubble 995 with a return from the procedure.

If, on the other hand, a tag match was detected in decision block 960, then decision path 962 is taken to decision block 980 where a test is performed to determine whether the matching translation table entry is valid. In the case where the valid bit data field for the successful candidate is the most significant bit, the valid bit can be tested by a branch on negative instruction as discussed previously.

If the matching translation table entry is determined in decision block 980 to be invalid, then decision path 982 is taken to process block 970 and a miss is declared. If, on the other hand, the matching translation table entry is valid, then decision path 984 is taken to process block 990 where a hit is declared before terminating the procedure at terminal bubble 995.

In one embodiment, procedure 900 is implemented in hardware. This permits the checking of the TSB entries that are pointed to by the pointers for each page size to be checked in a parallel manner. Alternately, procedure 900 is performed through the execution of software. A software implementation provides greater flexibility than that afforded by hardware. Furthermore, procedure 900 is structured so that operations within the procedure can be interleaved. Interleaving permits the checking of multiple entries of the translation storage buffer without a linear increase in the amount of time necessary to make the checks. Thus, if only one TSB entry were being tested, idle cycles would be "wasted" while the central processing unit was waiting for operations that have a long latency to complete. Because one TSB translation table entry is checked for each page size, some of the idle cycles caused by a test for a first page size can be used to perform the test for the second page size. Moreover, if procedure 900 is executed on a superscalar processor (i.e. one that can execute multiple instructions concurrently), the translation table entries of the TSB can be checked in parallel even in a software implementation.

While the method and apparatus of the present invention has been described in terms of its presently preferred and alternate embodiments, those skilled in the art will recognize that the present invention may be practiced with modification and alternation within the spirit and scope of the appended claims. The specifications and drawings are, accordingly, to be regarded in an illustrative rather than a restrictive sense.

What is claimed is:

1. A method for translating a first virtual address to a physical address when there is a miss in a translation lookaside buffer (TLB), the method comprising the steps of:

(a) receiving the first virtual address including a virtual page offset and a virtual page number, the first virtual address being mapped by an unknown page size, the unknown page size being one of a plurality of different page sizes;

(b) selecting one of the plurality of page sizes to be a test page size;

(c) calculating a pointer into a translation storage buffer (TSB), the TSB being in main memory and cacheable, the pointer being calculated from the first virtual address by assuming that the first virtual address corresponds to a mapping of the test page size, the pointer pointing to a candidate translation table entry (TTE) of the translation storage buffer, the candidate TTE including a candidate tag and candidate data, the candidate tag identifying a particular virtual address and the candidate data identifying a particular physical address corresponding to the particular virtual address;

(d) extracting a virtual address target tag from the first virtual address, the virtual address target tag being calculated by assuming that the first virtual address corresponds to the mapping of the test page size;

(e) comparing the virtual address target tag to the candidate tag; and (f) providing the candidate data as the physical address translation corresponding to the first virtual address when the virtual address target tag is identical to the candidate tag.

2. The method as set forth in claim 1 wherein the TSB is varied in size dynamically.

3. The method as set forth in claim 1 wherein the TSB stores the candidate TTEs corresponding to at least two different page sizes.

4. The method as set forth in claim 1 wherein a copy of a portion of the TSB is cached in cache memory.

5. The method as set forth in claim 1 wherein the candidate tag corresponds to at least two different page sizes.

6. The method as set forth in claim 1 further comprising selecting another of the plurality of different page sizes as the test page size; and repeating steps (c)–(f).

7. The method as set forth in claim 1 wherein the TTE contains a global bit to specify whether the TTE is context specific.

8. The method as set forth in claim 7 wherein the TTE contains a context information.

9. The method as set forth in claim 8 wherein the context information is used to match a context number corresponding to the first virtual address when the global bit is set to indicate that the TTE is context specific.

10. An apparatus for translating a first virtual address to a physical address when there is a miss in a translation lookaside buffer (TLB), the apparatus comprising:

a receiver adapted to receiving the first virtual address, the first virtual address comprising a virtual page offset and a virtual page number, the first virtual address being mapped by an unknown page size, the unknown page size being one of a first and second page size, the first page size not equal to the second page size;

a calculator coupled to the receiver, the calculator adapted to calculating first and second pointers of a translation storage buffer (TSB), the TSB being in main memory and cacheable, the first pointer being calculated from the first virtual address by assuming that the first virtual address corresponds to a mapping of the first page size, the first pointer pointing to a first candidate translation table entry (TTE) of the TSB, the first candidate (TTE) including a first candidate tag and a first candidate data, the first candidate tag identifying a first particular virtual address and the first candidate data identifying a first particular physical address corresponding to the first particular virtual address, the second pointer being calculated from the first virtual address by assuming that the first virtual address corresponds to a mapping of the second page size, the second pointer pointing to a second candidate TTE of the TSB, the second candidate TTE including a second candidate tag and a second candidate data, the second candidate tag identifying a second particular virtual address and the second candidate data identifying a second particular physical address corresponding to the second particular virtual address;

an extractor coupled to the receiver, the extractor adapted to extracting first and second virtual address target tags from the first virtual address, the first virtual address target tag being calculated by assuming that the first virtual address corresponds to a mapping of the first page size, the second virtual address target tag being calculated by assuming that the first virtual address corresponds to a mapping of the second page size;

a first comparator coupled to the calculator and the extractor, the first comparator adapted to comparing the first target tag to the first candidate tag;

a first provider coupled to the first comparator, the first provider adapted to providing the first candidate data as the physical address translation corresponding to the first virtual address if the first target tag matches the first candidate tag;

a second comparator coupled to the calculator and the extractor, the second comparator adapted to comparing the second target tag to the second candidate tag; and a second provider coupled to the second comparator, the second provider adapted to providing the second candidate data as the physical address translation corresponding to the first virtual address if the second target tag matches the second candidate tag.

11. The apparatus as set forth in claim 10 wherein the TSB is varied in size dynamically.

12. The apparatus as set forth in claim 10 wherein the TSB stores the candidate TTEs corresponding to at least two different page sizes.

13. The apparatus as set forth in claim 10 wherein a copy of a portion of the TSB is cached in cache memory.

14. The apparatus as set forth in claim 10 wherein the candidate tag corresponds to at least two different page sizes.

15. The apparatus as set forth in claim 10 wherein the TTE contains a global bit to specify whether the TTE is context specific.

16. The apparatus as set forth in claim 15 wherein the TTE contains a context information.

17. The apparatus as set forth in claim 16 wherein the context information is used to match a context number corresponding to the first virtual address when the global bit is set to indicate that the TTE is context specific.

* * * * *